(12) United States Patent
Deguchi (10) Patent No.: US 11,398,717 B2
(45) Date of Patent: Jul. 26, 2022

(54) SPARK PLUG AND METHOD FOR MANUFACTURING THE SAME

(71) Applicant: DENSO CORPORATION, Kariya (JP)

(72) Inventor: Masataka Deguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/404,371

(22) Filed: Aug. 17, 2021

(65) Prior Publication Data

US 2021/0376575 A1  Dec. 2, 2021

Related U.S. Application Data (63) Continuation of application No. PCT/JP2020/004589, filed on Feb. 6, 2020.

(30) Foreign Application Priority Data

Feb. 18, 2019 (JP) .............. JP2019-026316

(51) Int. Cl.
*H01T 13/04* (2006.01)
*H01T 13/34* (2006.01)
*H01T 13/40* (2006.01)
*H01T 21/02* (2006.01)

(52) U.S. Cl.
CPC ............. *H01T 13/04* (2013.01); *H01T 13/34* (2013.01); *H01T 13/40* (2013.01); *H01T 21/02* (2013.01)

(58) Field of Classification Search
CPC ......... H01T 13/04; H01T 13/34; H01T 13/40; H01T 21/02
USPC .......................................... 313/141
See application file for complete search history.

(56) References Cited

U.S. PATENT DOCUMENTS

| | | | | |
|---|---|---|---|---|
| 5,962,957 A | * | 10/1999 | Tanaka | H01T 13/34 313/143 |
| 2006/0082275 A1 | * | 4/2006 | Lykowski | H01T 13/467 313/123 |
| 2010/0051683 A1 | | 3/2010 | Kudo et al. | |
| 2011/0148273 A1 | | 6/2011 | Yamada et al. | |
| 2012/0186568 A1 | | 7/2012 | Steinberger | |
| 2018/0331511 A1 | | 11/2018 | Maki | |
| 2019/0044310 A1 | | 2/2019 | Maki | |
| 2019/0305523 A1 | * | 10/2019 | Iwasaki | H01T 13/34 |
| 2020/0312544 A1 | * | 10/2020 | Tsunenaga | H01F 27/2828 |

FOREIGN PATENT DOCUMENTS

| | | |
|---|---|---|
| JP | 2012-167624 | 9/2012 |
| JP | 2014164796 A * | 9/2014 |

* cited by examiner

*Primary Examiner* — Christopher M Raabe
(74) *Attorney, Agent, or Firm* — Nixon & Vanderhye P.C.

(57) ABSTRACT

A spark plug includes a terminal electrode extending in an axial direction of the spark plug. The terminal electrode has an end in the axial direction, and has a recess formed in the end of the terminal electrode. The recess has a bottom surface and an identifier on the bottom surface. The recess has a side surface parallel to the axial direction.

7 Claims, 5 Drawing Sheets

SPARK PLUG AND METHOD FOR MANUFACTURING THE SAME

CROSS REFERENCE TO RELATED APPLICATIONS

The present application is a continuation of International Application No. PCT/JP2020/004589 filed Feb. 6, 2020 which designated the U.S. and claims the benefit of priority from Japanese Patent Application No. 2019-026316, filed Feb. 18, 2019, the entire contents of each of which are incorporated herein by reference.

TECHNICAL FIELD

The present disclosure relates to spark plugs.

BACKGROUND

A conventional spark plug has a terminal electrode to be in contact with a conductive spring of an ignition coil, and the terminal electrode has a conical recess formed in an end thereof.

SUMMARY

A spark plug according to an exemplary aspect includes a terminal electrode extending in an axial direction of the spark plug. The terminal electrode has an end in the axial direction, and has a recess formed in the end of the terminal electrode. The recess has a bottom surface and an identifier on the bottom surface. The recess has a side surface parallel to the axial direction.

BRIEF DESCRIPTION OF THE DRAWINGS

The foregoing and other objects, features, and advantages of the present disclosure will become more apparent from the following detailed description with reference to the accompanying drawings, in which.

EMBODIMENTS

Japanese Unexamined Patent Application Publication (Translation of PCT Application) No. 2013-501180 discloses a conventional spark plug having a terminal electrode to be in contact with a conductive spring of an ignition coil. The terminal electrode has a conical recess formed in an end thereof. According to the patent publication, the conical shape of the recess facilitates guidance of the conductive spring during mounting thereof and allows an end of the conductive spring to be well secured to the conical recess even under the influence of vibration.

In contrast, another type of spark plug has no recess in an end of its terminal electrode may have an identifier printed on the face of the end of the terminal electrode. The discloser of the present disclosure has focused on the following problem resulting from printing of an identifier on the bottom surface of a conical recess formed in an end of a terminal electrode of a spark plug.

That is, applying light to the identifier in an axial direction of the spark plug may cause the light to reflect irregularly in the conical recess, making the identifier hard to read.

To solve the problem above, the present disclosure aims to provide spark plugs, each of which is capable of facilitating reading of an identifier on the bottom surface of a recess formed in an end of a terminal electrode thereof.

A first aspect of the present disclosure for solving the above problem provides a spark plug. The spark plug includes a terminal electrode disposed to extend in an axial direction of the spark plug. The terminal electrode has an end in the axial direction. The spark plug includes a recess formed in the end of the terminal electrode. The recess has a bottom surface and a side surface parallel to the axial direction of the spark plug. The spark plug includes an identifier formed on the bottom surface of the recess.

The spark plug according to the first aspect includes the terminal electrode disposed to extend in the axial direction of the spark plug. The spark plug includes the recess formed in the end of the terminal electrode in the axial direction. This configuration of the spark plug enables an end of, for example, a conductive spring of an ignition coil to be accommodated in the recess. Such a conductive spring of an ignition coil only needs to be in contact with the terminal electrode and thus may not necessarily have its end accommodated in the recess.

Reading the identifier on the bottom surface of the recess provides information on the spark plug. The recess has a side surface parallel to the axial direction. This reduces or prevents light, which is applied to the identifier in the axial direction, from being reflected off the side surface of the recess. Therefore, irregular reflection of light is less likely to occur in the recess, making the identifier easy to read. That is, the spark plug having the recess at the end of the terminal electrode makes it possible to have information as an identifier on the bottom surface of the recess while enabling the identifier to be well read.

In a spark plug according to the second aspect, the recess includes a first recessed portion and a second recessed portion. The first recessed portion has a first side surface and a first distance provided between radially opposite points on the first side surface thereof. The second recessed portion has a second side surface and a second distance provided between radially opposite points on the second side surface thereof. The second distance is shorter than the first distance. The second recessed portion has the bottom surface on which the identifier is formed.

The recess includes the first recessed portion and the second recessed portion. The first recessed portion has the first distance between radially opposite points on the first side surface thereof. The second recessed portion has the second distance between radially opposite points on the second side surface thereof. The second distance is shorter than the first distance. The second recessed portion has the identifier formed on the bottom surface thereof. This configuration of the spark plug according to the second aspect enables an end of, for example, a conductive spring of an ignition coil to be accommodated in the first recessed portion without being accommodated in the second recessed portion. This prevents the end of the conductive spring from being in contact with the identifier on the bottom surface of the second recessed portion. This therefore prevents the identifier from wearing with use of the spark plug.

A third aspect of the present disclosure provides a spark plug. The spark plug according to the third aspect includes a terminal electrode disposed to extend in an axial direction of the spark plug. The terminal electrode has an end in the axial direction. The spark plug includes a recess formed in the end of the terminal electrode. The recess includes a first recessed portion and a second recessed portion. The first recessed portion has a first side surface and a first distance provided between radially opposite points on the first side surface thereof. The second recessed portion has a bottom surface, a second side surface, and a second distance provided between radially opposite points on the second side surface thereof. The second distance is shorter than the first distance. The spark plug incudes an identifier formed on the bottom surface of the second recessed portion.

One of the first recessed portion and the second recessed portion has a greater depth in the axial direction of the spark plug. The one of the first recessed portion and the second recessed portion, which has the greater depth in the axial direction of the spark plug, has a side surface parallel to the axial direction of the spark plug.

One of the first recessed portion and the second recessed portion has the greater depth in the axial direction of the spark plug. The one of the first recessed portion and the second recessed portion, which has the greater depth in the axial direction of the spark plug, has the side surface parallel to the axial direction of the spark plug.

This configuration of the spark plug according to the third aspect reduces or prevents light, which is applied to the identifier in the axial direction, from being reflected off the one of the first recessed portion and the second recessed portion, which has the greater depth in the axial direction of the spark plug. This therefore achieves advantages that are substantially identical to those achieved by the spark plug of the first aspect.

Additionally, because the configuration of the spark plug according to the third aspect is identical to that of the spark plug according to the second aspect, the spark plug according to the third aspect achieves advantages that are substantially identical to those achieved by the spark plug of the second aspect.

The side surface of the other of the first recessed portion and the second recessed portion may be parallel or not parallel to the axial direction of the spark plug.

In a spark plug according to a fourth aspect, the bottom surface of the recess has a circular shape or a shape similar to an outer shape of the identifier.

The recess having the circular bottom surface is easily formed in the end of the terminal electrode in the axial direction. Alternatively, the recess having the bottom surface similar in outer shape to the identifier facilitates determination of the position of the identifier on the bottom surface of the recess.

Furthermore, the configuration of the fourth aspect enables a higher ratio of the area of the identifier to the area of the bottom surface of the recess, thereby enabling the identifier to contain a larger amount of information within the area of the bottom surface of the recess.

In a spark plug according to a fifth aspect, the identifier is a two-dimensional code. This enables the identifier on the axial end of the terminal electrode, which has a small area, to contain a larger amount of information compared with the case where the identifier is comprised of, for example, numbers.

In a spark plug according to a sixth aspect, the identifier contains information on a date of manufacture of the spark plug and information on a serial number indicative of the date of manufacture of the spark plug.

This configuration of the spark plug according to the sixth aspect facilitates identification of the date of manufacture of the spark plug and the serial number at that date of manufacture. This makes the identifier useful in analyzing the cause of a failure of the spark plug.

In a spark plug according to a seventh aspect, the identifier contains information on characteristics of the spark plug. This configuration allows characteristics of the spark plug to be directly read from it.

An eighth aspect of the present disclosure provides a method for manufacturing a spark plug according to any one of the first to seventh aspects. The method includes forming the identifier on the bottom surface of the recess by laser machining.

The method forms the identifier on the bottom surface of the recess by laser machining. The laser machining enables formation of the identifier on the bottom surface of the recess where machining is difficult to perform. Even when the identifier includes fine print or patterns, the laser machining enables formation thereof with clarity.

FIRST EMBODIMENT

The following describes a spark plug according to the first embodiment, which is embodied as a spark plug 10 used for an internal combustion engine, with reference to drawings.

Figure 1:
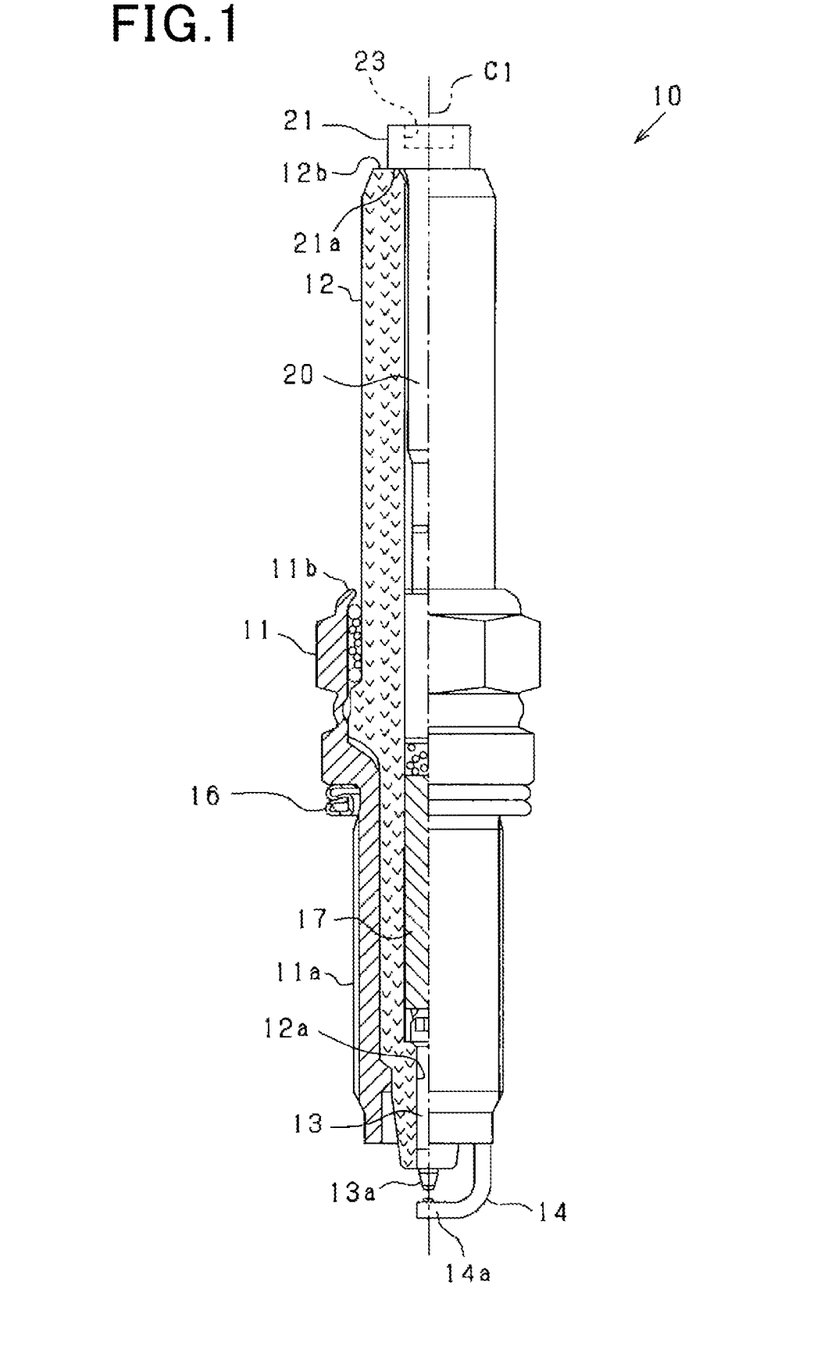
FIG. 1 is a half cross-sectional view of a spark plug according to a first embodiment.

As illustrated in FIG. 1, the spark plug 10 includes a cylindrical housing 11 composed of a metal material, such as an iron material. The housing 11 serves as a main fitting, and has a lower portion and a threaded portion 11a formed on the outer periphery of the lower portion.

The spark plug 10 includes a cylindrical ceramic insulator 12 that has an upper portion and a lower portion. The lower portion of the insulator 12 is disposed in the housing 11 to be coaxial with the housing 11. The insulator 12 is composed of an insulating material, such as an alumina material.

The housing 11 has a lower end, i.e., a first end, and an upper end 11b. The upper end 11b of the housing 11 is crimped against the insulator 12, so that the housing 11 and insulator 12 are joined to each other. The insulator 12 has a through hole 12a formed therethrough; the through hole 12a serves as a hollow portion. The spark plug 10 includes a center electrode 13 disposed and retained in a lower end portion, i.e., a first end portion, of the through hole 12a of the insulator 12.

The center electrode 13 has a cylindrical shape. The base material of the center electrode 13 is a nickel (Ni) alloy, which is, for example, highly heat-resistant. Specifically, the center electrode 13 has an inner portion serving as its central portion composed of copper and an outer portion serving as its outer peripheral portion composed of a nickel-base (Ni-base) alloy. The center electrode 13 has a lower end 13a exposed from a lower end, i.e., a first end, of the insulator 12.

The spark plug 10 includes a ground electrode 14. The ground electrode 14 is arranged to curvedly extend from a surface of the lower end, i.e., the first end, of the housing 11 up to a predetermined position that faces the lower end 13a of the center electrode 13. That is, the ground electrode 14 is joined to the housing 11 and curved such that an extending end 14a of the ground electrode 14 faces a surface 15a of the lower end 13a of the center electrode 13. The ground electrode 14 is composed of a Ni-base alloy.

This arrangement of the lower end 13a of the center electrode 13 and the extending end 14a of the ground electrode 14, which faces the lower end 13a of the center electrode 13, provides a spark gap between the lower end 13a of the center electrode 13 and the extending end 14a of the ground electrode 14. This enables an electric discharge to occur between the lower end 13a of the center electrode 13 and the extending end 14a of the ground electrode 14, thereby generating a spark discharge.

The spark plug 10 includes a gasket 16 disposed around an upper end of the threaded portion 11a of the housing 11. The gasket 16 enables the spark plug 10 to be attached to an internal combustion engine therethrough. With the spark plug 10 mounted to the combustion chamber of an internal combustion engine, the center electrode 13 and ground electrode 14 of the spark plug 10 are exposed into the combustion chamber.

The spark plug 10 includes a terminal electrode 20 electrically connected to an upper portion of the center electrode 13 via a resistor 17. The terminal electrode 20 is disposed to extend in an axial direction (see reference character C1) of the spark plug 10. The terminal electrode 20 has a cylindrical shape or a column shape.

The terminal electrode 20 has an upper end 21 and a lower end in the axial direction C1; the upper end 21 of the terminal electrode 20 is located to be farther from the center electrode 13 than the lower end thereof is. The upper end 21 is electrically connected to an ignition coil, which serves as an external circuit, via a conductive spring. The ignition coil is configured to apply a high voltage to the terminal electrode 20 for generating a spark.

The upper end 21 of the terminal electrode 20 has an outer diameter larger than the other portions of the terminal electrode 20. The insulator 12 has an upper end, i.e., a second end, that has a face, i.e., an end face, 12b of the insulator 12. The upper end 21 of the terminal electrode 20 has a face, i.e., a lower end face, 21a that is in abutment with the end face 12b of the upper end 12 of the insulator 12.

Figure 2:
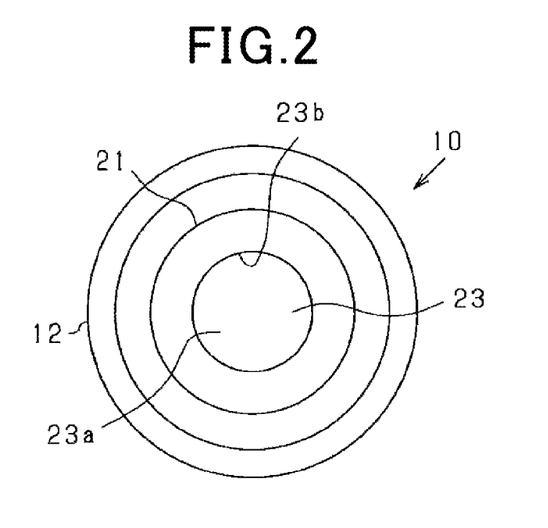
FIG. 2 is a plan view of the spark plug illustrated in FIG. 1.
Figure 3:
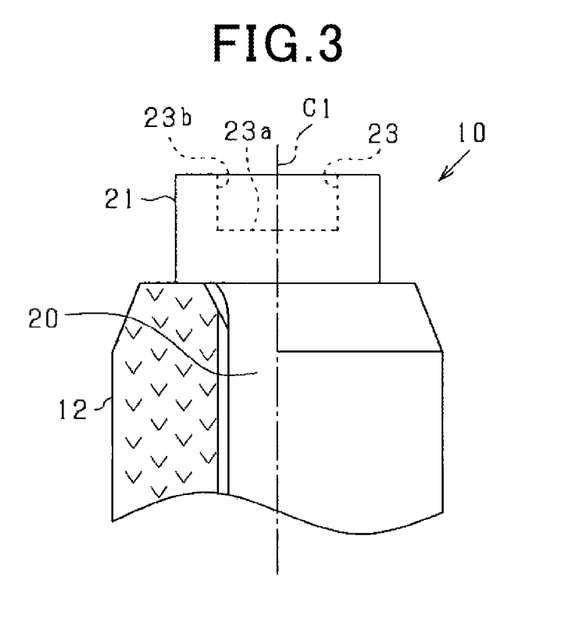
FIG. 3 is an enlarged view illustrating an upper portion of the spark plug illustrated in FIG. 1.

FIG. 2 is a plan view of the spark plug 10, and FIG. 3 is an enlarged view illustrating an upper portion of the spark plug 10.

As illustrated in FIGS. 2 and 3, the upper end 21 of the terminal electrode 20 has a recess 23 formed therein extending in the axial direction C1 of the spark plug 10. The recess 23 has a cylindrical shape. That is, the upper end 21 has a cylindrical and closed-bottom shape. The recess 23 has a circular bottom surface 23a. The bottom surface 23a has a center located on the axial direction C1 of the spark plug 10. The bottom surface 23a is perpendicular to the axial direction C1 of the spark plug 10. The recess 23 has a peripheral side surface 23b that extends in parallel to the axial direction C1 of the spark plug 10. An end of the conductive spring of the ignition coil is for example accommodated in the recess 23.

Figure 4:
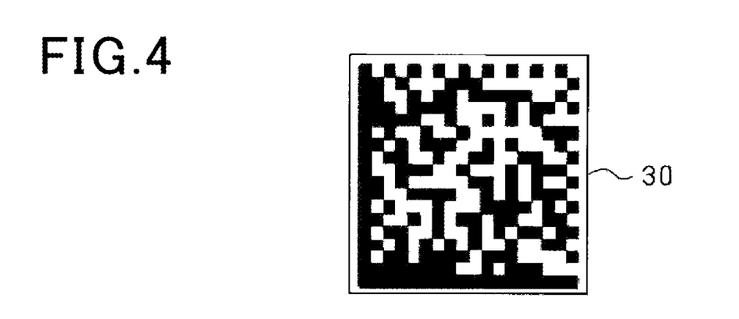
FIG. 4 is a view illustrating a data matrix code (DMC)

The bottom surface 23a of the recess 23 has a data matrix code (DMC) 30 thereon as illustrated in FIG. 4. The DMC 30 has a square outer shape. Laser machining is applied to the bottom surface 23a of the recess 23 to thereby write the DMC 30, which serves as a two-dimensional code, i.e., an identifier, on the bottom surface 23a. Irradiating the bottom surface 23a with a laser beam as laser machining may cut the bottom surface 23a to thereby engrave the bottom surface 23a with the DMC 30. As another example, burning and/or oxidizing the bottom surface 23a may discolor the bottom surface 23a to thereby write the DMC 30 thereon. As a further example, peeling a coating or plating on the bottom surface 23a may create contrasts on the bottom surface 23a, which show the DMC 30 thereon.

The DMC 30 contains information on the date of manufacture of the spark plug 10 and information on a serial number indicative of the date of manufacture of the spark plug 10. If spark plugs were manufactured at the same date, serial numbers starting with 1, 2, 3 . . . have been sequentially assigned to the respective spark plugs.

The DMC 30 further contains information on characteristics of the spark plug 10. The information on the characteristics of the spark plug 10 includes at least one of (1) The width of the spark gap
(2) A value of resistance of the resistor 17
(3) A tightening torque required to mount the spark plug 10 to a combustion chamber of an internal combustion engine
(4) A temperature range of the spark plug 10

The DMC 30 may further contain at least one of the following information items:

1. Internal combustion engines compatible with the spark plug 10 (i.e., types of compatible vehicles)
2. Mileage for which replacement of the spark plug 10 is recommended
3. The type and product name of the spark plug 10
4. The name of a customer who has bought the spark plug 10
5. The name of a manufacturer of the spark plug 10 and a site it is manufactured
6. The URL of a home page describing service for the spark plug 10

The first embodiment described in detail above has the following advantages.

Reading the identifier on the bottom surface 23a of the recess 23 provides information on the spark plug 10. The side surface 23b of the recess 23 is configured to extend to be parallel to the axial direction C1 of the spark plug 10.

This configuration of the spark plug 10 reduces or prevents light, which is applied to the identifier in the axial direction C1, from being reflected off the side surface 23b of the recess 23. For example, when an image of the identifier is captured with a camera using the flash, this configuration of the spark plug 10 reduces or prevents light based on the flash from being reflected off the side surface 23b of the recess 23.

This reduction or prevention in reflection of incident light from the side surface 23b of the recess 23 enables irregular reflection of the incident light to be less likely to occur in the recess 23, making the identifier on the bottom surface 23a easy to read. That is, the spark plug 10 having the recess 23 at the upper end 21 of the terminal electrode 20 makes it possible to have information as an identifier on the bottom surface 23a of the recess 23 while enabling the identifier to be well read.

The circular outline of the bottom surface 23a of the recess 23 enables the recess 23 to be easily formed in the upper end 21 of the terminal electrode 20 by drilling or other cutting process.

The spark plug 10 includes, as the identifier, the DMC 30, such as two-dimensional code. This configuration allows the identifier on the axial end 21 of the terminal electrode 20, which has a small area, to contain a lot of information compared with the case where the identifier is composed of numbers or the like.

The DMC 30 is configured to include information on the date of manufacture of the spark plug 10 and information on a serial number at that date of manufacture. This configuration facilitates identification of the date of manufacture of the spark plug 10 and the serial number at that date of manufacture. This makes the DMC 30 useful in analyzing the cause of a failure of the spark plug 10.

The DMC 30 further contains information on characteristics of the spark plug 10. This configuration allows the characteristics of the spark plug 10 to be directly read from it.

The DMC 30 is formed in the bottom surface 23a of the recess 23 by laser machining. The laser machining enables formation of the DMC 30 on the bottom surface 23a of the recess 23 where processing is difficult to perform. Even when the DMC 30 includes fine patterns, the laser processing enables formation thereof with clarity.

SECOND EMBODIMENT

The following describes a spark plug 10 according to a second embodiment of the present disclosure. The upper end 21 of the terminal electrode 20 of the spark plug according to the second embodiment has a recess 33 formed therein; the recess 33 is comprised of a first recessed portion 35 and a second recessed portion 37 as illustrated in FIGS. 5 and 6.

The following description focuses on differences between the first and second embodiments. Components identical to those of the first embodiment are denoted by the same reference signs and will not be described.

Figure 5:
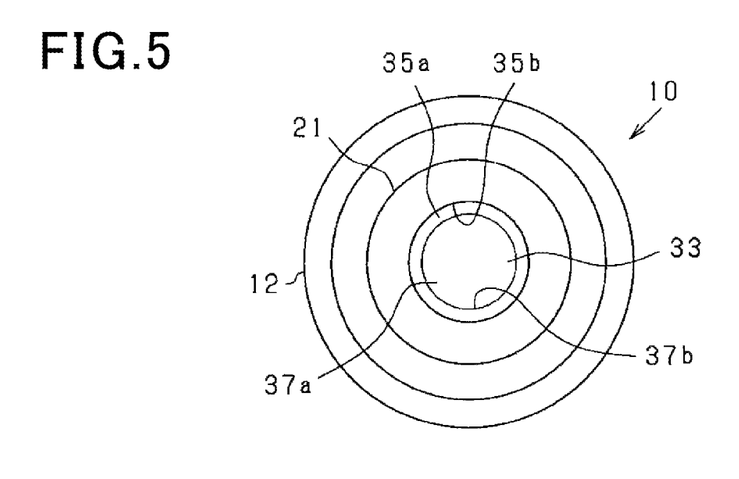
FIG. 5 is a plan view of a spark plug according to a second embodiment.
Figure 6:
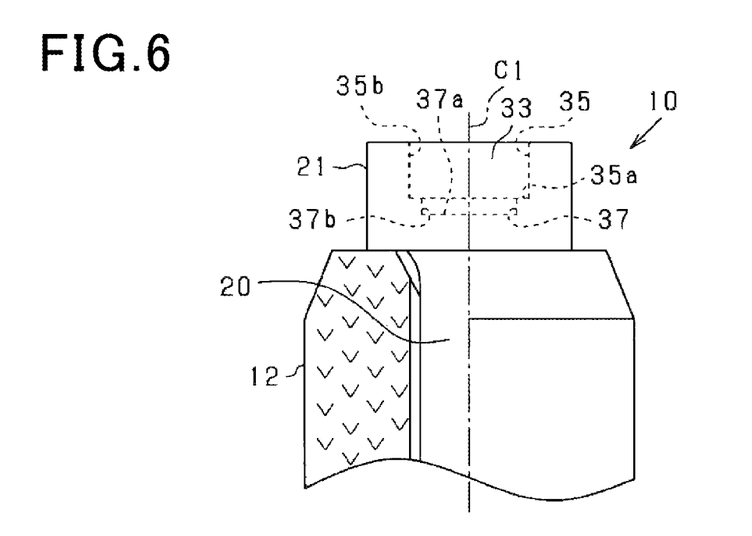
FIG. 6 is an enlarged view illustrating an upper portion of the spark plug illustrated in FIG. 5.

As illustrated in FIGS. 5 and 6, the upper end 21 of the terminal electrode 20 has the recess 23 formed therein extending in the axial direction C1 of the spark plug 10. The recess 33 includes the first recessed portion 35 and the second recessed portion 37.

Each of the first recessed portion 35 and second recessed portion 37 has a cylindrical shape.

The first recessed portion 35 has an inner diameter D1. That is, the first recessed portion 35 has a peripheral side surface 35b, and has a distance D1, i.e., a first distance, between radially opposite points on the peripheral side surface 35b thereof.

The second recessed portion 37 is disposed in the bottom of the first recessed portion 35. The second recessed portion 37 has an inner diameter D2. That is, the second recessed portion 37 has a peripheral side surface 37b, and has a distance D2, i.e., a second distance, between radially opposite points on the peripheral side surface 37b thereof. The second distance (inner diameter) D2 is smaller than the first distance (inner diameter) D1.

The first recessed portion 35 and the second recessed portion 37 respectively have bottom surfaces 35a and 37a. The outline of the bottom surface 35a has a circular shape, and the outline of the bottom surface 37a has a circular shape. Each of the bottom surfaces 35a and 37a has a center located on the axial direction C1 of the spark plug 10.

The bottom surfaces 35a and 37a are perpendicular to the axial direction C1 of the spark plug 10. The first and second recessed portions 35 and 37 respectively have the peripheral side surfaces 35b and 37b that are parallel to the axial direction C1 of the spark plug 10. An end of the conductive spring of the ignition coil is for example accommodated in the first recessed portion 35 without being accommodated in the second recessed portion 37. That is, the inner diameter D2 of the second recessed portion 37 is set to be smaller than an outer diameter of the end of the conductive spring.

The bottom surface 37a of the second recessed portion 37 has formed thereon a DMC 30 similar to that of the first embodiment.

The second embodiment described in detail above has the following advantages. The following describes advantages different from the first embodiment.

The recess 33 includes the first recessed portion 35 and the second recessed portion 37. The first recessed portion 35 has the distance D1 between radially opposite points on the peripheral side surface 35b thereof. The second recessed portion 37 has the distance D2 between radially opposite points on the peripheral side surface 37b thereof. The distance D2 is set to be shorter than the distance D1. The second recessed portion 37 has the DMC 30 on the bottom surface 37a thereof. This configuration of the spark plug 10 enables an end of the conductive spring of the ignition coil to be accommodated in the first recessed portion 35 without being accommodated in the second recessed portion 37. This prevents the end of the conductive spring from being in contact with the DMC 30 on the bottom surface 37a of the second recessed portion 37. This therefore prevents the DMC 30 from wearing with use of the spark plug 10.

THIRD EMBODIMENT

Figure 7:
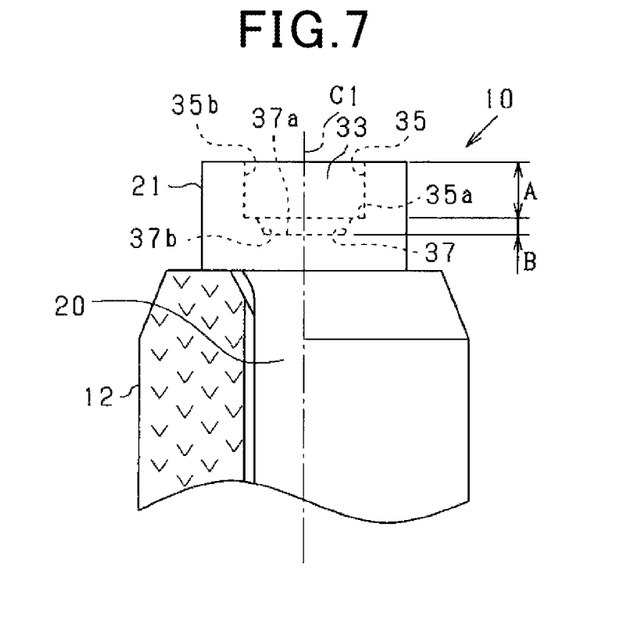
FIG. 7 is an enlarged view illustrating an upper portion of a spark plug according to a third embodiment.

The following describes a spark plug 10 according to a third embodiment of the present disclosure. The first recessed portion 35 has a peripheral side surface 35b that is parallel to the axial direction C1 of the spark plug 10, but the second recessed portion 37 has a peripheral side surface 37b that is not parallel to the axial direction C1 of the spark plug 10, as illustrated in FIG. 7. The third embodiment has the same configuration as the second embodiment except for this point. Components identical to those of the first and second embodiments are denoted by the same reference signs and will not be described. The first recessed portion 35 has a depth A greater than a depth B of the second recessed portion 37. The side surface 35b of the first recessed portion 35, having a greater depth in the axial direction C1 than the second recessed portion 37, is parallel to the axial direction C1. The side surface 37b of the second recessed portion 37, having a smaller depth in the axial direction C1 than the first recessed portion 35, is inclined relative to the axial direction C1. The second recessed portion 37 has a truncated conical shape.

The third embodiment described in detail above has the following advantages. The following describes advantages different from the first and second embodiments.

The first recessed portion 35 has the greater depth in the axial direction C1 of the spark plug 10 than the second recessed portion 37 and has the peripheral side surface 35b parallel to the axial direction C1. This configuration of the spark plug 10 reduces or prevents light, which is applied to the DMC 30 in the axial direction C1, from being reflected off the side surface 35b of the first recessed portion 35. Thus, the third embodiment produces the same effects as those of the first and second embodiments.

The third embodiment may be implemented with the following modification.

Figure 8:
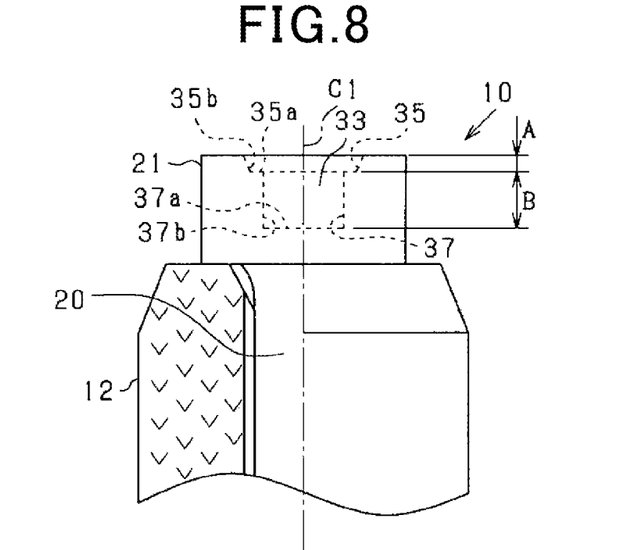
FIG. 8 is an enlarged view illustrating an upper portion of a spark plug according to a modification of the third embodiment.

As illustrated in FIG. 8, the side surface 35b of the first recessed portion 35 of a spark plug 10 according to a modification of the third embodiment is not parallel to the axial direction C1 of a spark plug 10, while the side surface 37b of the second recessed portion 37 is parallel to the axial direction C1. Components of this modification, which are identical to those of the first to third embodiments, are denoted by the same reference signs and will not be described.

The first recessed portion 35 has a depth A smaller than a depth B of the second recessed portion 37. The second recessed portion 37 has a greater depth in the axial direction than the first recessed portion 35 and has a peripheral side surface 37b parallel to the axial direction C1. The first recessed portion 35 has a smaller depth in the axial direction than the second recessed portion 37 and has a peripheral side surface 35b inclined relative to the axial direction C1. The first recessed portion 35 has a truncated conical shape. The spark plug 10 according to this modification is configured such that the second recessed portion 37 has the greater depth in the axial direction C1 of the spark plug 10 than the first recessed portion 35 and has the side surface 37b parallel to the axial direction C1. This configuration of the spark plug 10 reduces or prevents light, which is applied to the DMC 30 in the axial direction C1, from being reflected off the side surface 35b of the first recessed portion 35. Thus, this modification produces the same effects as those of the first to third embodiments.

FOURTH EMBODIMENT

Figure 9:
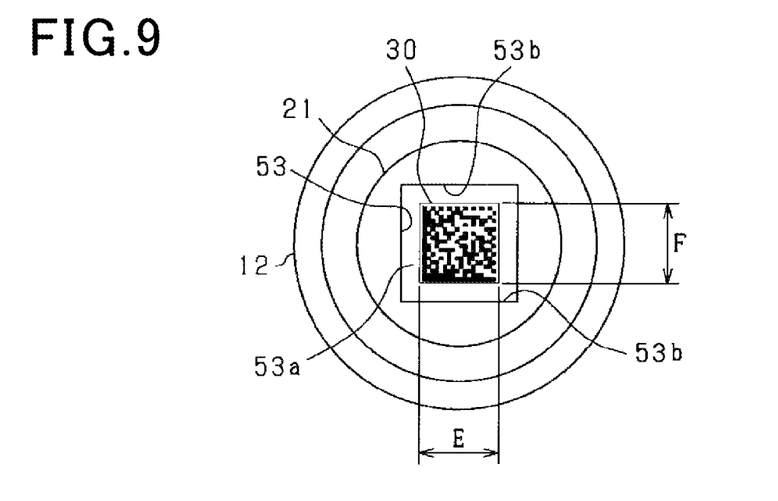
FIG. 9 is a plan view of a spark plug according to a fourth embodiment.

The following describes a spark plug according to a fourth embodiment of the present disclosure. The spark plug 10 of the third embodiment is configured such that the recess 53 has a bottom surface 53a whose outline is similar in the outline of the DMC 30 serving as an identifier as illustrated in FIG. 9. The fourth embodiment has the same configuration as the first embodiment except for this point. Components identical to those of the first embodiment are denoted by the same reference signs and will not be described.

As illustrated in FIG. 9, the recess 53 has a quadrangular prism shape, i.e., a polygonal column shape. The bottom surface 53a of the recess 53 has a square shape. The recess 53 has a distance E between opposite surfaces 53b thereof. The distance E is longer than a side of the DMC 30. The bottom surface 53a has a center located on the axial direction C1 of the spark plug 10. The bottom surface 53a is perpendicular to the axial direction C1 of the spark plug 10. The side surfaces 53b are parallel to the axial direction C1 of the spark plug 10. The bottom surface 53a has formed thereon a DMC 30 similar to that of the first embodiment. An end of the conductive spring is for example accommodated in the recess 53.

The fourth embodiment described in detail above has the following advantages. The following describes advantages different from the first to third embodiments.

The recess 53, having the bottom surface 53a similar in outer shape to the DMC 30, facilitates determination of the position of the DMC 30 on the bottom surface 53a of the recess 53. Furthermore, this configuration of the spark plug 10 enables a higher ratio of the area of the DMC 30 to the area of the bottom surface 53a of the recess 53, making it possible for the DMC 30 to contain a larger amount of information within the area of the bottom surface 53a of the recess 53.

The recess 53 may include the following first recessed portion and second recessed portion: the first recessed portion has a first distance between opposite surfaces thereof, while the second recessed portion has a second distance between opposite surfaces thereof, with the second distance being shorter than the first distance. The second recessed portion may have an identifier on a bottom surface thereof.

The following modifications may be made to the above embodiments. Components of each modification, which are identical to those of the first to fourth embodiments, are denoted by the same reference signs and will not be described.

Figure 10:
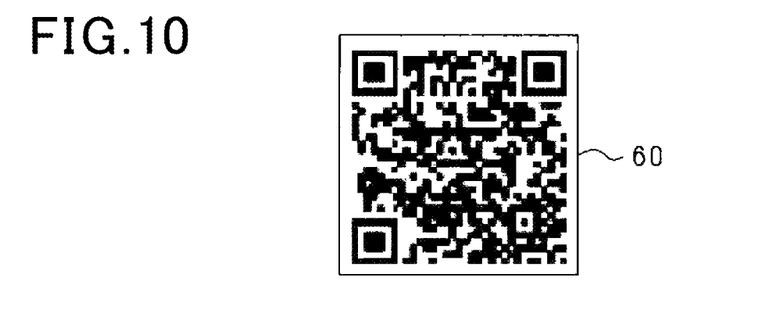
FIG. 10 is a view illustrating a QR code.

A QR code 60 (registered trademark) as illustrated in FIG. 10 or a micro QR code may be used as the identifier. This configuration allows the identifier on the axial end 21 of the terminal electrode 20, which has a small area, to contain a larger amount of information compared with the case where the identifier is comprised of, for example, numbers. The identifier may be comprised of a barcode, numbers, letters, or symbols.

The bottom surfaces 23a, 37a, and 53a may have an identifier displayed thereon with a stamp, or an identifier ink-jet printed thereon, or an identifier adhesive thereto as an adhesive label.

Figure 11:
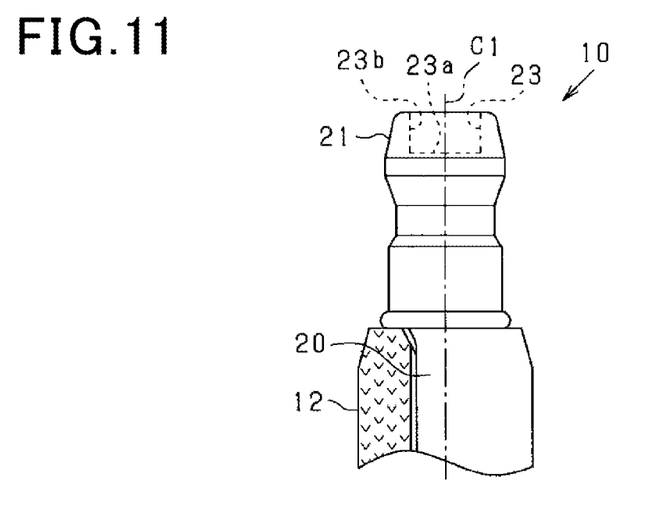
FIG. 11 is an enlarged view illustrating an upper portion of a modified spark plug.

As illustrated in FIG. 11, the spark plug 10 may be designed such that the upper end 21 of the terminal electrode 20 has an outer periphery to which an end of, for example, the conductive spring of the ignition coil is fitted. In that case as well, the bottom surface 23a of the recess 23 has an identifier formed thereon, producing the same effects as the first embodiment.

The present disclosure has been described in accordance with the embodiments above, but should not be construed as being limited to these embodiments, the configurations, and the like. The present disclosure includes various variations, and modifications within the range of equivalency. In addition to various combinations and forms, other combinations and forms including one or more/less elements thereof are also within the spirit and scope of the present disclosure.

What is claimed is:

1. A spark plug comprising:
a terminal electrode disposed to extend in an axial direction of the spark plug, the terminal electrode having an end in the axial direction;
a recess formed in the end of the terminal electrode, the recess having a bottom surface and a side surface parallel to the axial direction of the spark plug; and
an identifier formed on the bottom surface of the recess, wherein
the recess comprises a first recessed portion and a second recessed portion;
the first recessed portion has a first side surface and a first distance provided between radially opposite points on the first side surface thereof;
the second recessed portion has a second side surface and a second distance provided between radially opposite points on the second side surface thereof;
the second distance is shorter than the first distance;
the second recessed portion has the bottom surface on which the identifier is formed.

2. A spark plug comprising:
a terminal electrode disposed to extend in an axial direction of the spark plug, the terminal electrode having an end in the axial direction;
a recess formed in the end of the terminal electrode,
the recess comprising a first recessed portion and a second recessed portion,
the first recessed portion having a first side surface and a first distance provided between radially opposite points on the first side surface thereof, the second recessed portion having a bottom surface, a second side surface, and a second distance provided between radially opposite points on the second side surface thereof, the second distance being shorter than the first distance; and an identifier formed on the bottom surface of the second recessed portion, wherein one of the first recessed portion and the second recessed portion has a greater depth in the axial direction of the spark plug; and the one of the first recessed portion and the second recessed portion, which has the greater depth in the axial direction of the spark plug, has a side surface parallel to the axial direction of the spark plug.

3. The spark plug according to claim 1, wherein the bottom surface of the recess has a circular shape or a shape similar to an outer shape of the identifier.

4. The spark plug according to claim 1, wherein the identifier is a two-dimensional code.

5. The spark plug according to claim 1, wherein the identifier contains information on a date of manufacture of the spark plug and information on a serial number indicative of the date of manufacture of the spark plug.

6. The spark plug according to claim 1, wherein the identifier contains information on characteristics of the spark plug.

7. A method for manufacturing a spark plug according to claim 1, the method comprising forming the identifier on the bottom surface of the recess by laser machining.

\* \* \* \* \*